Figure 6:
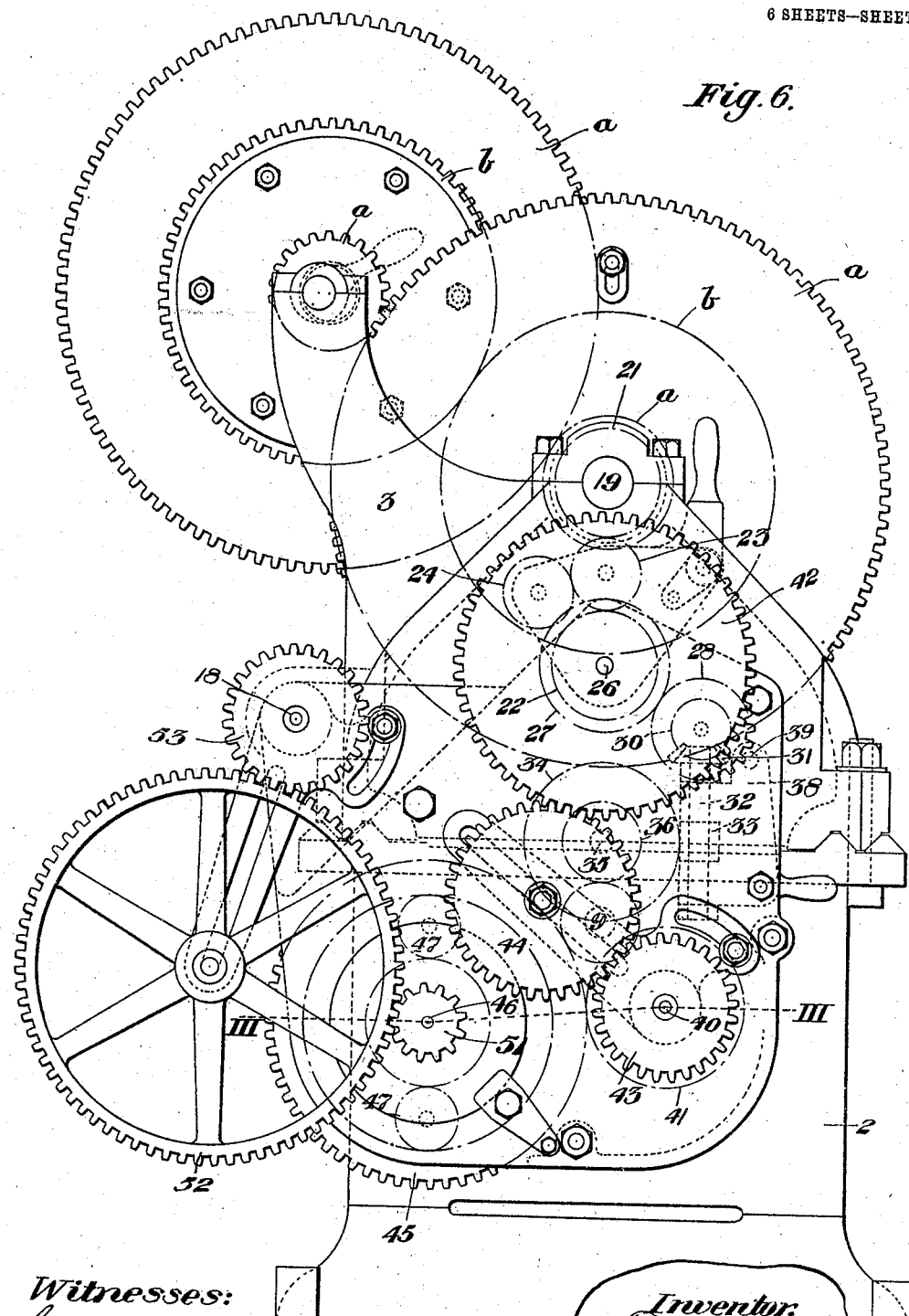

No. 806,075. PATENTED NOV. 28, 1905.
T. FAWCUS.
SPIRAL GEAR CUTTING MACHINE.
APPLICATION FILED AUG. 19, 1904.
6 SHEETS—SHEET 1.
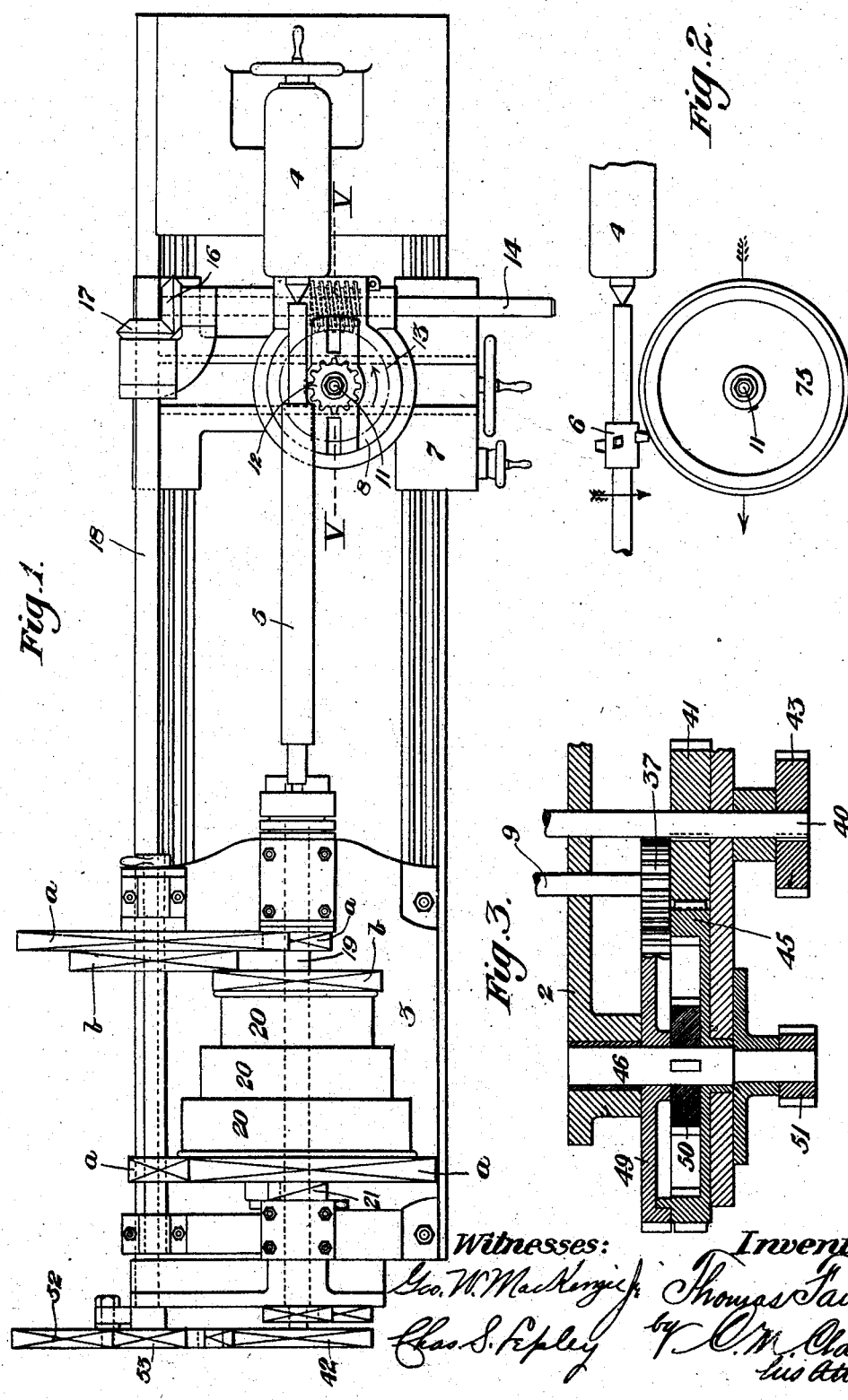
Witnesses:
Geo. W. MacKenzie
Chas. S. Lipley
Inventor:
Thomas Fawcus
by C. M. Clarke
his Attorney.

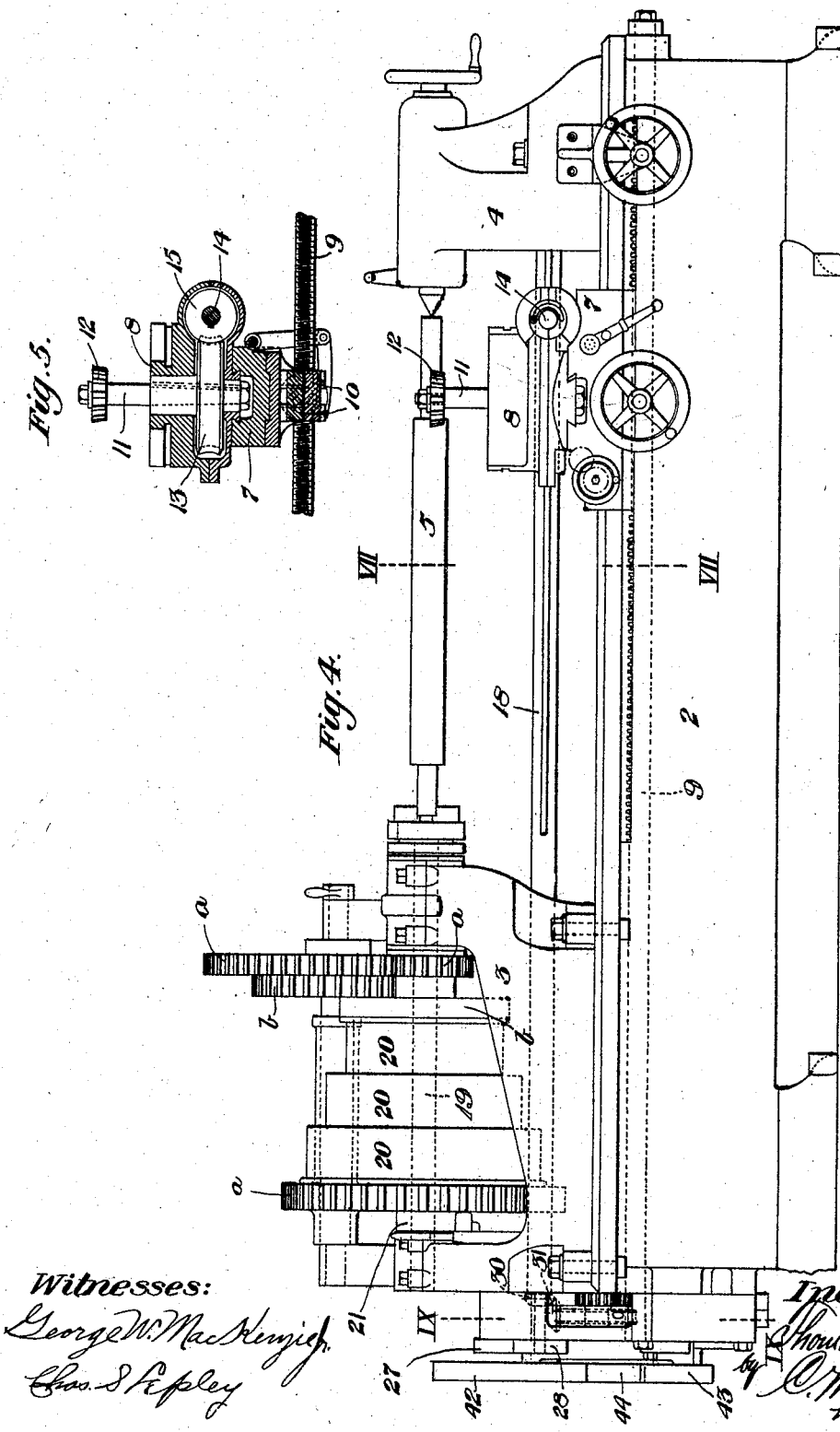

No. 806,075. PATENTED NOV. 28, 1905.
T. FAWCUS.
SPIRAL GEAR CUTTING MACHINE.
APPLICATION FILED AUG. 19, 1904.

6 SHEETS—SHEET 3.

No. 806,075. PATENTED NOV. 28, 1905.
T. FAWCUS.
SPIRAL GEAR CUTTING MACHINE.
APPLICATION FILED AUG. 19, 1904.

6 SHEETS—SHEET 4.

Witnesses:
George W. Mackenzie Jr.
Chas. S. Ripley

Inventor:
Thomas Fawcus
by O. M. Clarke
his Attorney

No. 806,075. PATENTED NOV. 28, 1905.
T. FAWCUS.
SPIRAL GEAR CUTTING MACHINE.
APPLICATION FILED AUG. 19, 1904.
6 SHEETS—SHEET 5.
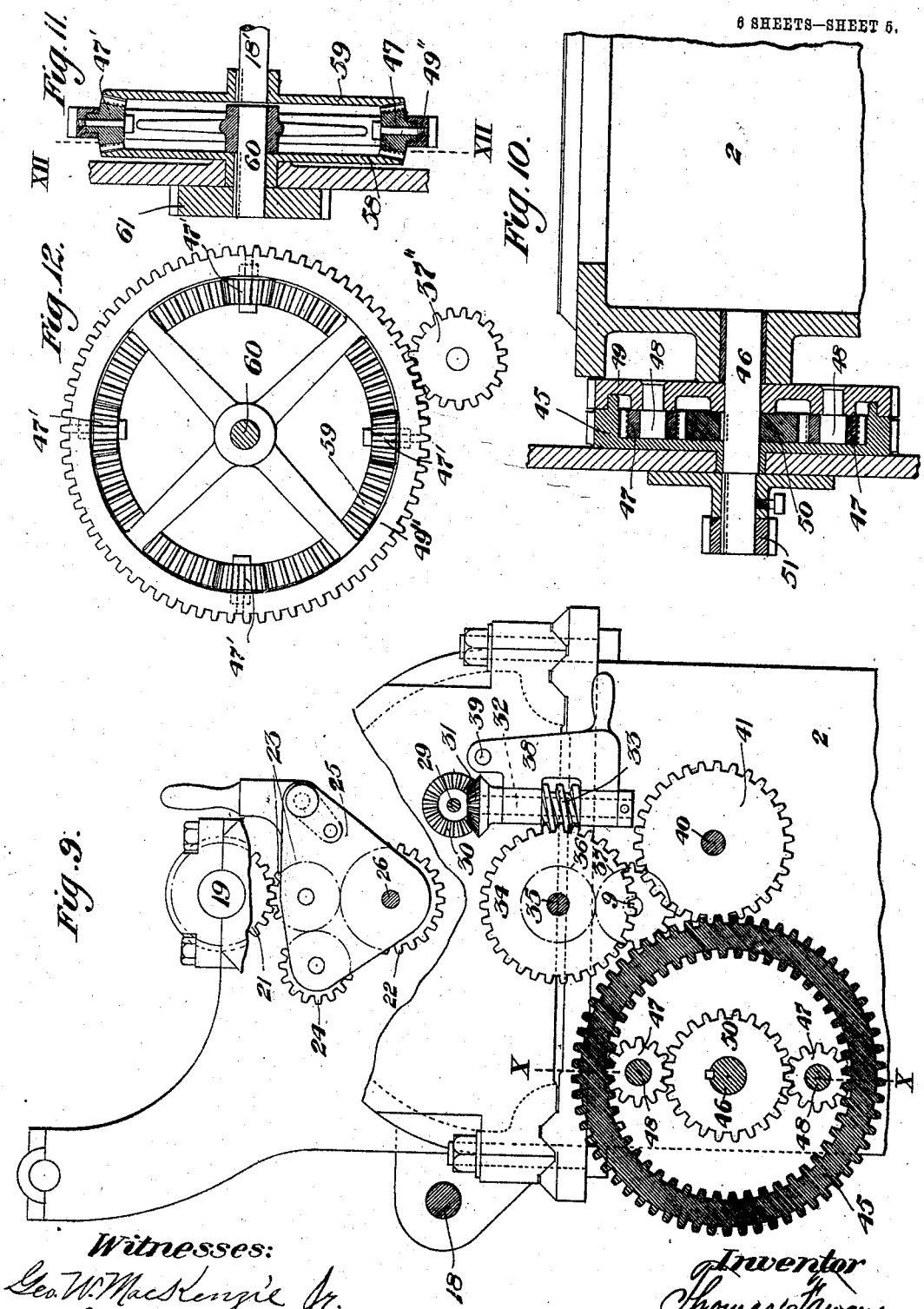

No. 806,075. PATENTED NOV. 28, 1905.
T. FAWCUS.
SPIRAL GEAR CUTTING MACHINE.
APPLICATION FILED AUG. 19, 1904.
6 SHEETS—SHEET 6.
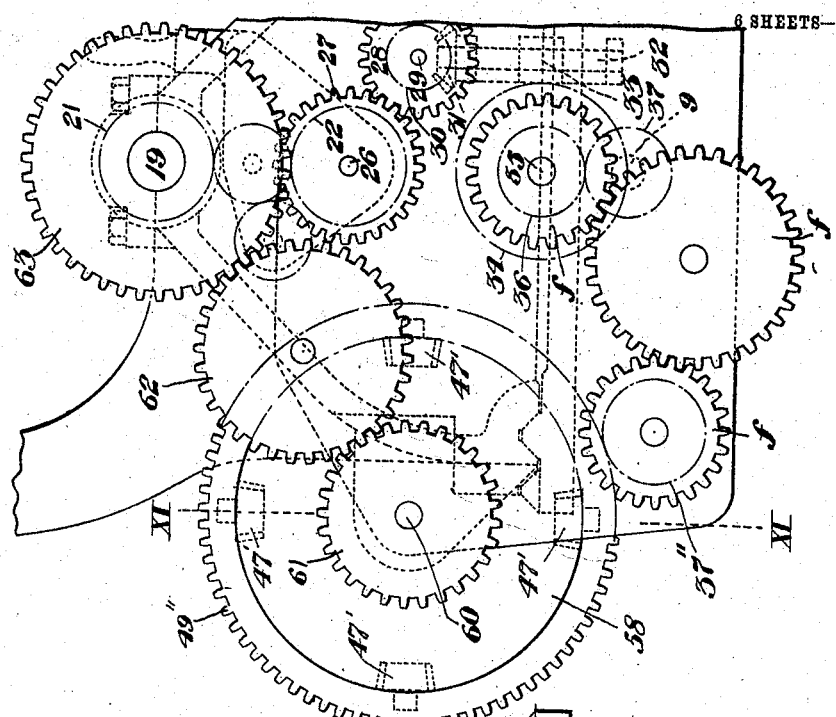
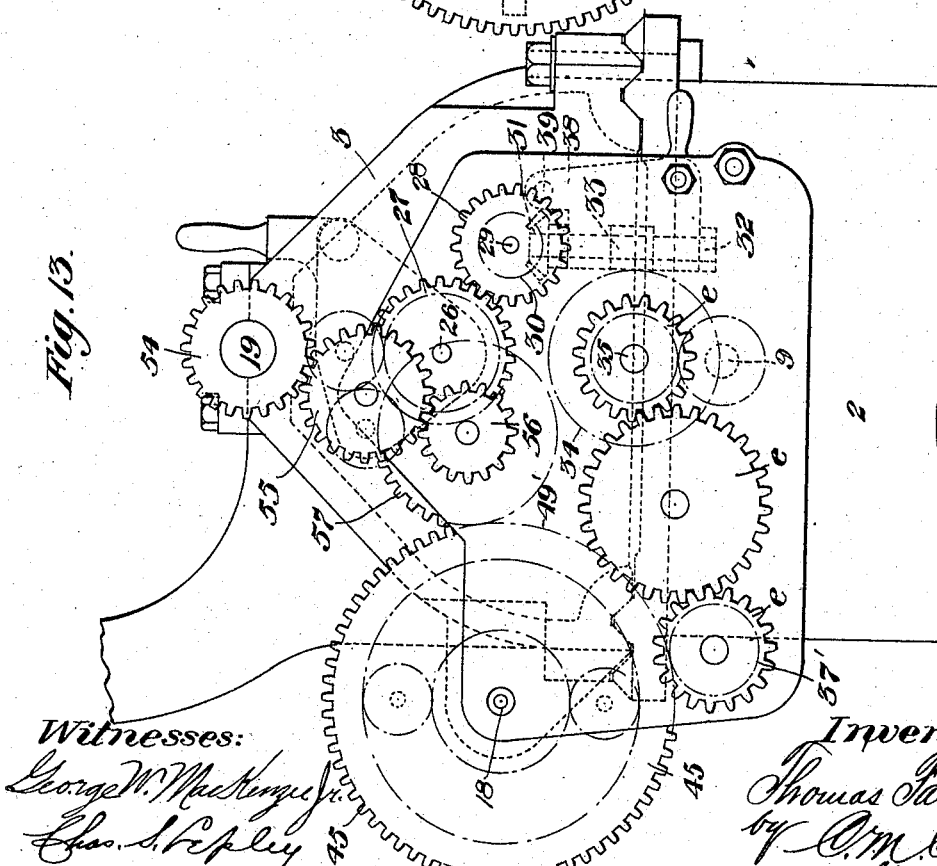
Witnesses:
Inventor:
Thomas Fawcus
by O. M. Clarke
his Attorney.

UNITED STATES PATENT OFFICE.

THOMAS FAWCUS, OF PITTSBURG, PENNSYLVANIA.

SPIRAL-GEAR-CUTTING MACHINE.

No. 806,075.  Specification of Letters Patent.  Patented Nov. 28, 1905.

Application filed August 19, 1904. Serial No. 221,419.

*To all whom it may concern:*

Be it known that I, THOMAS FAWCUS, a citizen of the United States, residing at Pittsburg, in the county of Allegheny and State of Pennsylvania, have invented certain new and useful Improvements in Spiral-Gear-Cutting Machines, of which the following is a specification, reference being had therein to the accompanying drawings.

My invention consists of an improved machine or apparatus for generating correctly-formed teeth in spiral gearing, worms, or worm-wheels continuously and automatically, so as to produce correctly-formed teeth in one series of operations.

If a worm and wheel in mesh be driven at a ratio other than their normal ratio, one or the other will move longitudinally from its starting position, if free to do so. (By "normal ratio" is meant the relative speeds determined by the number of teeth in each—as, for instance, a double-thread worm meshing with a wheel of one hundred teeth would have a normal ratio of one hundred to two, or fifty to one.) Thus one member, either the worm or the wheel, will have been rotated faster or slower than its normal speed, and a longitudinal movement necessarily results in order to compensate for this difference.

My machine is designed to set the cutter to gradually and finally cut the full depth of thread of a worm or spiral gear, the cutter being caused to advance parallel with the axis of the blank, making continuous series of thin shaving cuts, gradually forming or generating the threads or teeth in its progress, making them full depth and of correct form without further attention by continuously operating and continuously adjusted mechanism, as hereinafter described. As applied to the making of worm-wheels, the cutter and blank occupy relations alternately corresponding to those of the cutter and blank in forming a worm, and the cutter in such case may be described as the tooth of a hob which is rotated on its axis, the blank being mounted on another axis, both being rotated at the relative speed of the finished worm and wheel, while longitudinal and compensating movement is imparted to one of the elements for the same purpose as applied to the cutting of worms, as shall also be more fully hereinafter described.

In the operation of cutting a worm-wheel carried out in my machine the cutter first enters the worm-wheel blank by the point of one tooth. The cutter will take a small cut out of one space of the blank, then come around and take a cut out of the following space, and continue to do so until it has passed through the entire length of the worm it represents, by which time it will have formed spiral teeth around the worm-wheel blank, these teeth being of the proper shape to run with the worm. The amount of feed is regulated by the size and pitch of the work and is usually a very small amount for each revolution of the blank, the best results being obtained by operating the machine at a high relative speed with a very light cut.

It will be understood that the same principle is applied to the cutting of worms of one or more threads or spiral gears, which are worms of many threads, to which work my improved machine is particularly adapted. It will be readily seen that if a cutter similar in longitudinal section to a worm-wheel be substituted for the wheel and given the same relative movement as just described its teeth will mesh with the worm-threads, and if the longitudinal movement is independently imparted it will cut threads on a worm-blank rotated in place of the worm, provided the cutter is rotated at a speed differing from its normal speed to compensate for this longitudinal movement. Such operation requires no essential change in the operation, the change being made merely by substituting the cutter for the blank, (in case of a worm,) and vice versa. In order to set forth more clearly the nature of this so-called "compensation," which is a very important element in this machine, since without it a correct worm or screw cannot be cut continuously, we will assume that the feed determined upon for a certain worm of, say, one-inch pitch is one one-hundredth inch per revolution, so that in one hundred revolutions of the worm-blank one lineal inch of worm will be produced. We will assume that the cutter has a pitch circumference of exactly one foot and the normal ratio between the cutter and the worm to be cut is twenty to one. The cutter would consequently make five revolutions while the blank is making one hundred. As the pitch circumference is one foot, the velocity of the cutter would be five feet normally; but during the cutting operation it has been traveling in a longitudinal direction one inch. It is this one inch which is deducted from the circumferential velocity, so that the actual speed at the circumference of the cutter in five revolutions would be one inch less than five feet in the case just described, and that one inch would be made up by the one inch of longitudinal feed.

Either right or left hand threads may be cut with equal ease and of a pitch and size required by driving the machine in the proper direction by means of suitable gearing and at the proper speed to suit the work, utilizing the proper cutter for the size and shape of the tooth desired.

In all cases the compensation—i. e., the accelerating or retarding movement of the cutter or blank in the desired degree—is provided by the specially-designed mechanism incorporated with the apparatus.

The machine is designed for the purpose of producing correctly-formed worms after the method set forth in my prior application, filed October 26, 1903, bearing the Serial No. 178,579, and also for producing worm-wheels and other spiral gearing employing the same principles of operation.

Figure 7:
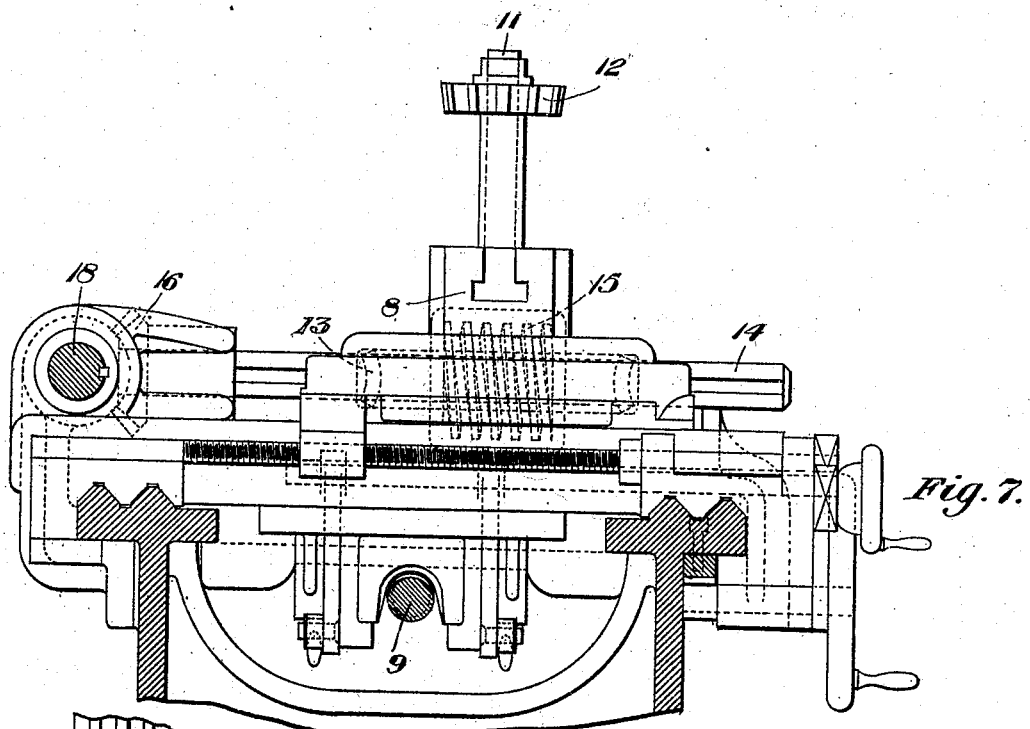
Figure 8:
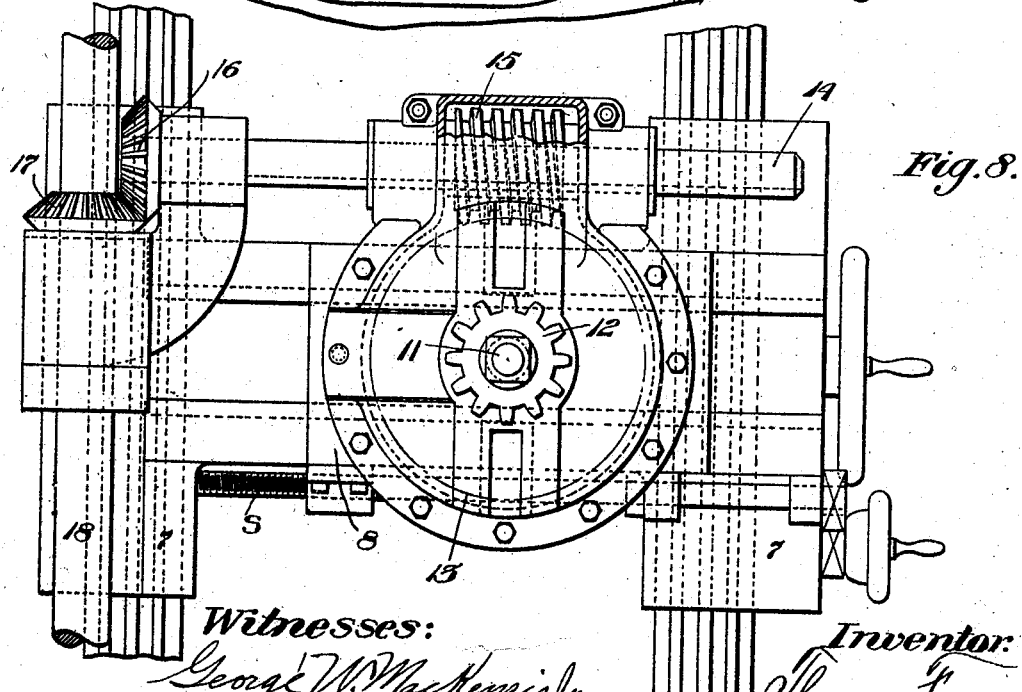

Referring now to the drawings, Figure 1 is a plan view of the apparatus as applied to the cutting of a worm. Fig. 2 is a partial similar detail view showing the application of the machine to the cutting of a worm-wheel. Fig. 3 is a cross-sectional detail view on the line III III of Fig. 6. Fig. 4 is a side elevation of the machine. Fig. 5 is a vertical sectional detail view indicated by the line V V of Fig. 1. Fig. 6 is an enlarged end view of the machine. Fig. 7 is a cross-sectional view on the line VII VII of Fig. 4. Fig. 8 is a plan view of the cutter-supporting carriage and actuating mechanism therefor. Fig. 9 is an end view of the machine indicated by the line IX IX of Fig. 4. Fig. 10 is a vertical sectional view through the compensating mechanism on the line X X of Fig. 9. Fig. 11 is a similar view showing a modified construction on the line XI XI of Fig. 14. Fig. 12 is a face view thereof on the line XII XII of Fig. 11. Fig. 13 is a partial end view similar to Fig. 6, showing a modified arrangement of gearing with the compensating gears connected directly with the spline-shaft. Fig. 14 is a similar view showing a modified arrangement of the compensating gearing employing bevel-wheels.

2 is the frame or bed of the machine mounted on a suitable foundation provided with a head-stock 3 and tail-stock 4, between which is rotated the worm-blank 5, in the case of cutting a worm, or the cutter 6 and its spindle, Fig. 2, in the case of cutting a worm-wheel.

7 is a longitudinally-traveling carriage mounted on suitable ways or tracks provided with a supplemental transversely-movable carriage 8, mounted on carriage 7.

9 is a feed-screw extending longitudinally of the machine engaging an adjustable nut 10 of carriage 7, the function of which screw is to feed the carriage 7 and its supported carriage 8 and the rotating cutter along the machine in proper relation to the relatively longitudinally stationary blank.

Rotatably mounted in carriage 8 is a vertical cutter-spindle 11, provided with a cutter 12 and a worm-wheel 13, located within the housing of the carriage 8. The cutter 12 consists of a gear-shaped tool provided with a series of circularly-arranged radiating cutting-teeth provided with edges adapted to make a light shaving cut. It corresponds in form with a pinion adapted to intermesh with the teeth of the finished worm being cut if run along the top of the finished worm as would the pinion of a rack were the teeth of the rack the same as those of the worm, although it is not necessary that the teeth of the cutter shall be continuous and spaced as to their pitch corresponding with all the teeth of such a pinion, as some of the cutting-teeth—as alternate ones—may be omitted. The cutter for forming the teeth of a worm-wheel is provided with one or more spirally-arranged cutting-teeth arranged to correspond with the spiral thread of a worm which will correctly intermesh with the teeth of the finished worm-wheel. Rotatably mounted in the side of carriage 8 is a shaft 14, upon which in splined engagement therewith is a worm 15 in mesh with the worm-wheel 13, whereby the cutter-spindle is rotated at whatever position the carriage 8 may assume. Shaft 14 is provided with a bevel-wheel 16, in mesh with a driving-bevel 17 on a spline-shaft 18, by which means motion is transmitted to shaft 14 at whatever position the carriage 7 and its supported mechanism may assume longitudinally.

The main spindle 19 and the blank 5 are driven from a belt passing around one of cone-pulleys 20 through gearing $a\ a\ a\ a$, and the desired relative speeds of rotation of the cutter and the longitudinal feed-screw 9 are secured through supplemental gearing, receiving their power from the main spindle 19, to which power is directly imparted from the pulleys 20 through gearing $a\ a\ a\ a$ at suitably-reduced speed. When it is desired to increase the speed, gears $b\ b$ are thrown into mesh and the adjoining gears $a\ a$ thrown out of mesh in the same manner employed in turning-lathes.

The feed-screw 9 is driven by pinion 21 on spindle 19 and pinion 22 through idler-wheel 23, or 24 and 23, according to the direction desired. Wheels 22, 23, and 24 form a train, wheels 22 and 23 being mounted in the tilting frame 25, pivoted on shaft 26, carrying wheel 22. Shaft 26 is provided with change-gear 27, meshing into change-gear 28 on shaft 29. This shaft 29 is provided with a bevel-wheel 30, meshing into bevel-wheel 31 on vertical shaft 32, provided with worm 33, engaging worm-wheel 34 on shaft 35, from which shaft power is imparted to the feed-screw 9 by wheels 36 37. The worm 33 and its shaft are mounted in a tilting bracket 38, pivoted at 39, by which the feeding mechanism may be thrown out of gear and the machine utilized as an ordinary lathe.

40 is a stud or pin provided with a gear 41, driven through change-gear 42 on shaft or stud 26 and gear 43, mounted on shaft 40 through an idler-wheel 44, mounted on a suitable arm. Gear 41 engages the outside teeth of an internal gear 45, loosely journaled on shaft 46, the internal teeth of gear 45 engaging pinions 47 47, journaled on studs 48, mounted in a plate gear-wheel 49, also journaled on shaft 46. Pinions 47 engage a gear 50, keyed on shaft 46, which is also provided at its outer end with a change-gear 51, from whence through idler-gear 52 power is imparted at the proper speed to change-gear 53, secured on the end of spline-shaft 18. By this means the spline-shaft is driven, and the cutter 12, through cross-shaft 14 and connected gearing, is rotated at its proper speed and normal ratio to the blank.

If the machine is now started without any further gearing, the cutter will travel along the face of the blank, removing the metal to whatever depth it has been set to, but will not produce a correct spiral on the face of the blank. In order to cut spiral teeth, it is necessary to accelerate or retard the blank or the cutter to compensate for the exact amount of longitudinal feed. This is most readily accomplished by retarding the cutter and is effected by inserting between the cutter and the blank a train of differential gears actuated by the feed-screw or the longitudinal travel of the carriage to vary the normal ratio of speed in the degree desired to produce the compensating acceleration or retard referred to. For this purpose the following mechanism is employed in combination with the cutter-driving mechanism: The gear 37, by which the feed-screw 9 is driven at slow speed, also meshes into the teeth of plate-gear 49, carrying the pinions 47. As feed-screw 9 slowly revolves in the act of feeding the carriage, it will cause the plate-gear 49 to revolve, carrying with it the pinions 47 on their studs 48 around shaft 46, so that retarded or accelerated motion is imparted to gear 50 and shaft 46 and from shaft 46 and gears 51, 52, and 53 to spline-shaft 18 and thence to the cutter. The gear 50, together with all of its subsequent gearing, will therefore be accelerated or retarded in the degree desired, losing part of its normal velocity or gaining a velocity beyond its normal velocity, as will also in consequence the cutter itself by reason of the adjustment of the studs 48 around gear 50. If the motion be reversed, the compensation will be reversed, as the case may be.

In explanation of the necessity for accelerating or retarding we will suppose that the worm has been cut and the cutter is in mesh with the worm and the machine is entirely at rest. We will now start up the machine, omitting the feed and the compensation. The worm and cutter will then revolve together precisely as a worm and wheel under ordinary conditions. If we now insert the feed-gears without compensation, the cutter will travel along the bed of the machine and destroy the teeth of the worm in doing so. If we now insert the compensating gears, the speed of the cutter will be changed so that it and the blank will again revolve as a normal wheel and worm, excepting that the wheel or cutter will travel along the bed of the machine. That both the feed and compensation must operate simultaneously is also shown by omitting the feed and retarding the cutter, when the teeth of the worm will again be destroyed. In the cutting of a right-hand worm it is found best to begin at the tail-stock end of the blank and cut toward the head-stock. In this case the cutter is "retarded" to compenpensate for the feed. If, however, the cutting of a right-hand worm were started from the head-stock end of the blank, it would be necessary to accelerate the speed of the cutter, because the feed would be in the opposite direction to the preceding case. If, however, a left-hand worm is being cut, it would, if started from the head-stock end, require retarding of the cutter and if started from the tail end require accelerating of the cutter. I have therefore used the term "compensation" as including whatever deduction from or accession to the speed of the cutter is necessary. Such conditions in speed, it can readily be seen, could be given to the blank instead of the cutter; but it has been found in practice more desirable to leave the speeds of the blank unchanged.

In Fig. 13 I have shown the compensating mechanism applied directly to the spline-shaft 18, the plate-gear 49' being driven by gear 37' through intervening change-gears *e e e* from shaft 35, while the internal gear 45 is driven direct from the spindle 19 through gears 54, 55, 56, and 57, the construction and operation otherwise being the same as already described.

In Figs. 11 and 12 I show a modified construction employing a pair of oppositely-located bevels 58 and 59, secured to the driven shaft 60 and spline-shaft 18', respectively. Shaft 60 is driven direct from spindle 19 through change-gears 61, 62, and 63. Between the bevels 58 and 59, rotatably mounted on shaft 60, is a ring-gear 49", carrying one or more bevels 47', adapted to transmit motion from bevel 58 to bevel 59. This gear carrying the bevels is driven by gear 37" through intervening change-gears *f f f* from shaft 35, the bevels acting to transmit retarded or accelerated motion from the spindle 19 to the spline-shaft in the same manner already described.

In order to cut worm-wheels, the blank is secured on the spindle 11 and is cut by means of a toothed cutter 6, Fig. 2, revolving between centers in the usual way and actuated by spindle 19, the blank being rotated by shafts 18 and 14 and the accompanying gearing and fed longitudinally by feed-screw 9, as clearly described, with the accompanying compensation.

The operation of the machine is precisely the same as would be the case for cutting a worm with a cutter having the same number of threads as are to be in the worm-wheel blank, the blank and the cutter revolving at their normal relative ratios—as, for instance, if a worm-wheel is to have one hundred teeth to run with a single thread-worm it would revolve once to one hundred revolutions of the cutter; if it is to run with a double thread-worm it would revolve once to fifty revolutions of the cutter. The feed would be in a longitudinal direction, so that the cutter would pass through a tangent to the wheel, and thereby pass through the spiral functions of a hob until the cutting terminated on the opposite side of the wheel-blank. The compensation would be in accordance with the feed, as before described.

In the illustrations given the cutter is shown passing from right to left, the worm-blank revolving toward the operator and producing a right-hand worm. In the case of a worm-wheel the blank assumes the place of the aforesaid cutter and the cutting-tooth the place of the aforesaid worm-blank. By reversing the direction of rotation of the cutter a left-hand worm would be produced.

The compensation in all cases would be equivalent to the lessening of the normal speed of rotation of the cutter; but if the direction of rotation of the cutter be reversed, so that the teeth strike the periphery of the blank and pass out toward the end of the blank instead of from the side or periphery, (the directions of rotation of the blank and feed not being changed,) the compensation would take the form of an increase in the speed of the cutter. The feed as herein described is longitudinal, though it is more correctly substantially parallel with the blank, and it will readily be seen that the elements and operations may assume a vertical or other position.

The apparatus is particularly adapted for cutting worms or other spiral gearing of coarse or heavy pitch. It is adapted to a wide range as to sizes, &c., and is very rapid, capable of producing mathematically-correct gears, is automatic in operation, and requires but little attention.

Changes and variations may be made in the design, proportions, arrangement, or location of the parts or in other details by the skilled mechanic; but all such changes are to be considered as within the scope of the following claims.

What I claim is—

1. In apparatus for generating spiral gear-teeth, the combination with a main power-driven spindle, of a longitudinally-traveling carriage provided with a vertical spindle, a spline-shaft and gearing arranged to rotate the vertical spindle, gearing arranged to transmit motion from the main power-driven spindle to the spline-shaft, a feed-screw geared with the main spindle arranged to propel the carriage, and compensating mechanism consisting of differential gearing interposed between the main spindle and the spline-shaft actuated by the feed-screw gearing, substantially as set forth.

2. The combination with a main longitudinal rotating spindle, driving mechanism therefor, a longitudinally-traveling carriage provided with a vertical spindle, a feed-screw for the carriage, gearing arranged to transmit motion from the main longitudinal rotating spindle to the feed-screw, and a spline-shaft and gearing arranged to rotate the vertical spindle; of compensating mechanism adapted to transmit motion from the main longitudinal rotating spindle to the spline-shaft consisting of a shaft geared with the main longitudinal rotating spindle and provided with a toothed wheel, a similar toothed wheel mounted on the spline-shaft, and a rotatably-mounted ring-gear provided with one or more idlers gearing into said toothed wheels, and gearing arranged to transmit motion to the ring-gear from the feed-screw gearing, substantially as set forth.

3. The combination with a rotating main spindle, driving mechanism therefor, a longitudinally-traveling carriage provided with a cutter-spindle having a cutter, gearing adapted to transmit motion to said cutter-spindle, and means for imparting longitudinal motion to the carriage; of compensating mechanism adapted to transmit motion from said main spindle to the carriage-spindle consisting of a shaft geared with said main spindle and provided with a bevel-wheel, a similar bevel-wheel connected with the cutter-spindle-driving mechanism, and a rotatably-mounted ring-gear provided with one or more bevels gearing into said bevel-wheels, with gearing arranged to transmit motion to the ring-gear from the means for imparting longitudinal motion to the carriage, substantially as set forth.

In testimony whereof I affix my signature in presence of two witnesses.

THOMAS FAWCUS.

Witnesses:
  JAS. J. MCAFEE,
  C. M. CLARKE.